United States Patent
Numata et al.

(10) Patent No.: US 12,173,783 B2
(45) Date of Patent: Dec. 24, 2024

(54) CONFIGURATIONS OF CONTROL VALVE UNIT AND STRAINER IN POWER TRANSMITTING DEVICE

(71) Applicants: JATCO Ltd, Fuji (JP); NISSAN MOTOR CO., LTD., Yokohama (JP)

(72) Inventors: Kazuya Numata, Isehara (JP); Tahei Toyoshima, Isehara (JP); Daisuke Yanagawa, Sagamihara (JP); Tomoya Otaki, Isehara (JP); Akira Higashiyama, Isehara (JP); Fuminori Satoh, Fukuoka (JP); Naoya Shimizu, Atsugi (JP)

(73) Assignees: JATCO LTD, Fuji (JP); NISSAN MOTOR CO., LTD., Fuji (JP)

( * ) Notice: Subject to any disclaimer, the term of this patent is extended or adjusted under 35 U.S.C. 154(b) by 126 days.

(21) Appl. No.: 17/258,528

(22) PCT Filed: Jun. 26, 2019

(86) PCT No.: PCT/JP2019/025277
§ 371 (c)(1),
(2) Date: Jan. 7, 2021

(87) PCT Pub. No.: WO2020/012956
PCT Pub. Date: Jan. 16, 2020

(65) Prior Publication Data
US 2021/0164557 A1  Jun. 3, 2021

(30) Foreign Application Priority Data
Jul. 11, 2018 (JP) .................... 2018-131522

(51) Int. Cl.
*F16H 57/04* (2010.01)
*F01M 11/00* (2006.01)
*F16H 61/00* (2006.01)

(52) U.S. Cl.
CPC ...... *F16H 57/0404* (2013.01); *F16H 57/0435* (2013.01); *F16H 57/0441* (2013.01); *F16H 61/0009* (2013.01); *F01M 2011/007* (2013.01)

(58) Field of Classification Search
CPC ............. F16H 57/0404; F16H 57/0435; F16H 57/0441; F16H 57/0452; F16H 61/0009; F01M 11/0004; F01M 2011/007
See application file for complete search history.

(56) References Cited

U.S. PATENT DOCUMENTS 4,914,907 A * 4/1990 Okada ............... B60K 17/105
                                                  60/487
5,857,442 A * 1/1999 Sumi .................. F01M 1/02
                                                  123/196 R (Continued)

FOREIGN PATENT DOCUMENTS

DE       19824158 A1 * 12/1998 ......... F16H 61/0009
JP       S57-025714 U    2/1982

(Continued)

OTHER PUBLICATIONS

Japan Office Action dated Aug. 23, 2022, Application No. 2020-530086.

*Primary Examiner* — Minh Truong
(74) *Attorney, Agent, or Firm* — Foley & Lardner LLP

(57) ABSTRACT

A continuously variable transmission has an oil pan, an oil strainer located above the oil pan and a control valve unit located above the oil pan. The control valve unit has a shape having a cutting portion formed by a part of the control valve unit being cut out when viewed from an oil pan side. The oil strainer is arranged so as to overlap the cutting portion. With this structure, it is possible to ease a restriction on layout in terms of a height direction in the continuously variable transmission.

8 Claims, 4 Drawing Sheets

(56) References Cited

U.S. PATENT DOCUMENTS

| | | | | |
|---|---|---|---|---|
| 5,971,719 A * | 10/1999 | Takeuchi | ............ | F16H 61/0025 |
| | | | | 417/307 |
| 8,292,036 B2 * | 10/2012 | Nishida | ............... | F16H 57/0402 |
| | | | | 184/6.24 |
| 2006/0175239 A1* | 8/2006 | Johnson | .............. | F16H 61/0031 |
| | | | | 210/232 |
| 2007/0199396 A1* | 8/2007 | Taniai | ................. | F16H 61/0009 |
| | | | | 74/335 |
| 2017/0268393 A1* | 9/2017 | Pekarsky | ........... | B01D 29/0093 |
| 2018/0142775 A1* | 5/2018 | Pekarsky | ................ | B03C 1/286 |

FOREIGN PATENT DOCUMENTS

| | | | | |
|---|---|---|---|---|
| JP | S57-090955 U | 6/1982 | | |
| JP | 2830077 B2 * | 12/1998 | ......... | F16H 61/0009 |
| JP | 2000-074194 A | 3/2000 | | |
| JP | 2001-065672 A | 3/2001 | | |
| JP | 2006-307986 A | 11/2006 | | |
| JP | 2010-230070 A | 10/2010 | | |
| JP | 2017-155928 A | 9/2017 | | |

\* cited by examiner

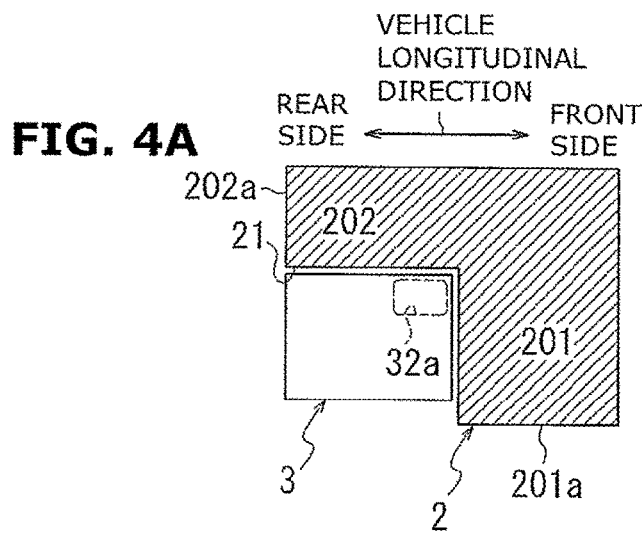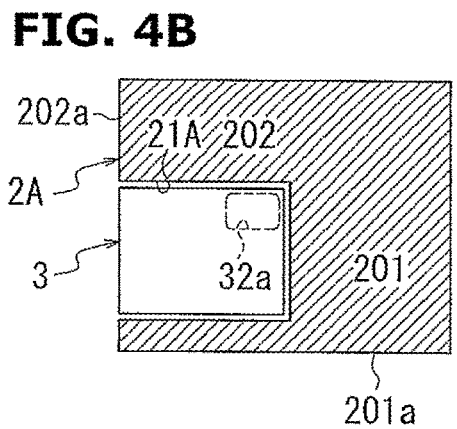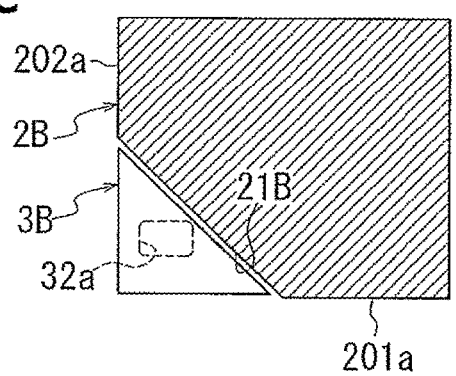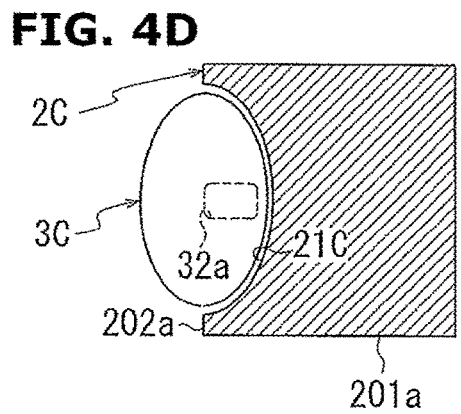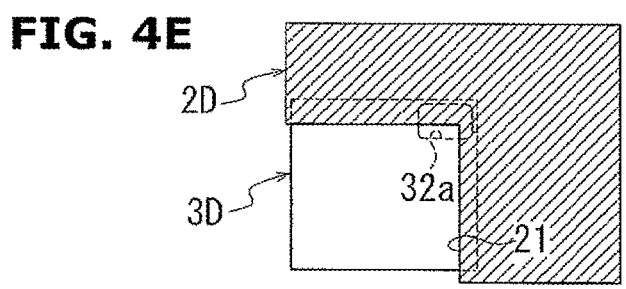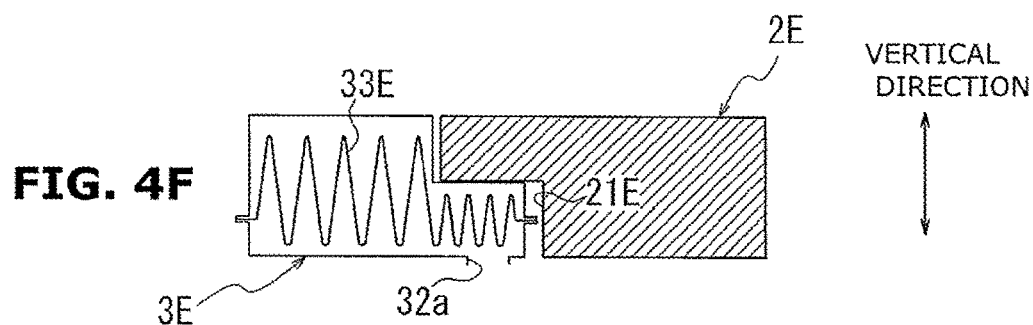

CONFIGURATIONS OF CONTROL VALVE UNIT AND STRAINER IN POWER TRANSMITTING DEVICE

The present invention relates to a power transmitting device.

BACKGROUND ART

Patent Document 1 discloses a structure of an oil pan for a vehicle transmission.

In Patent Document 1, a control valve and a strainer are arranged with these control valve and strainer completely overlapping each other in a height direction.

Because of this, there is a restriction on layout in terms of the height direction.

Therefore, achievement of easing the restriction on layout in terms of the height direction has been required.

CITATION LIST

Patent Document

Patent Document 1: Japanese Unexamined Patent Application Publication No. 2006-307986

SUMMARY OF THE INVENTION

In the present invention, a power transmitting device comprises: an oil pan; a strainer located above the oil pan; and a control valve unit located above the oil pan. And, the control valve unit has a shape having a cutting portion formed by a part of the control valve unit being cut out when viewed from an oil pan side, and the strainer overlaps the cutting portion.

According to the present invention, since the strainer overlaps the cutting portion, it is possible to ease the restriction on layout in terms of the height direction.

BRIEF DESCRIPTION OF DRAWINGS

FIGS. 4A to 4F are drawings for explaining modifications of the control valve unit.

EMBODIMENTS FOR CARRYING OUT THE INVENTION

In the following description, an embodiment of the present invention will be explained with a belt-type continuously variable transmission 1 for a vehicle being taken for an example.

Figure 1:
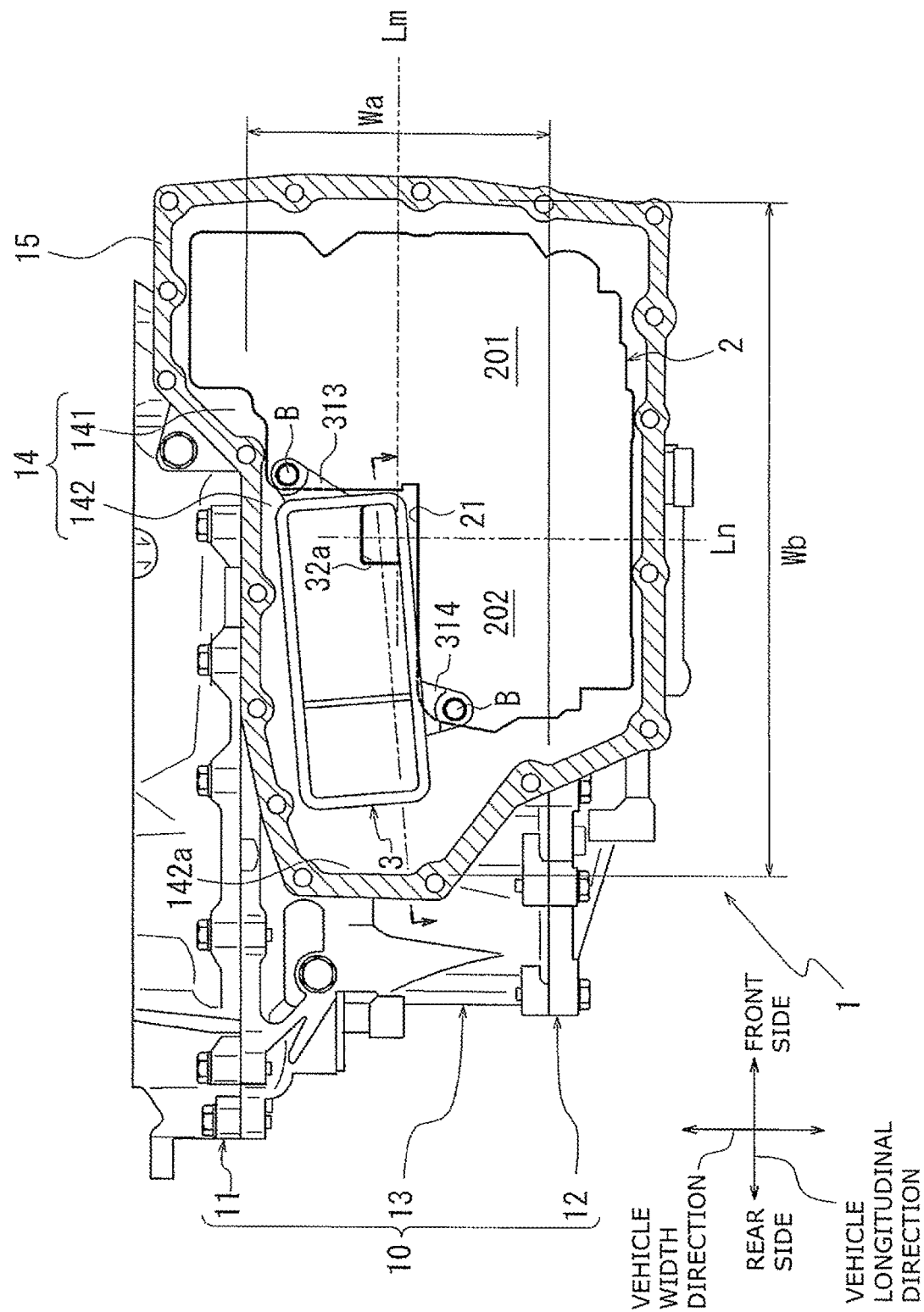
FIG. 1 is a drawing for explaining an arrangement of a control valve unit and an oil strainer in an opening of a transmission case.

FIG. 1 is a drawing for explaining an arrangement of a control valve unit 2 and an oil strainer 3 in an opening 14 of a transmission case 10. In FIG. 1, for convenience of explanation, an end surface of a circumferential wall portion 15 that surrounds the opening 14 is illustrated with hatching. Further, a shape of a lower surface of the control valve unit 2 is not illustrated, but an outer peripheral edge of the control valve unit 2 is illustrated with a thick line.

Figure 2:
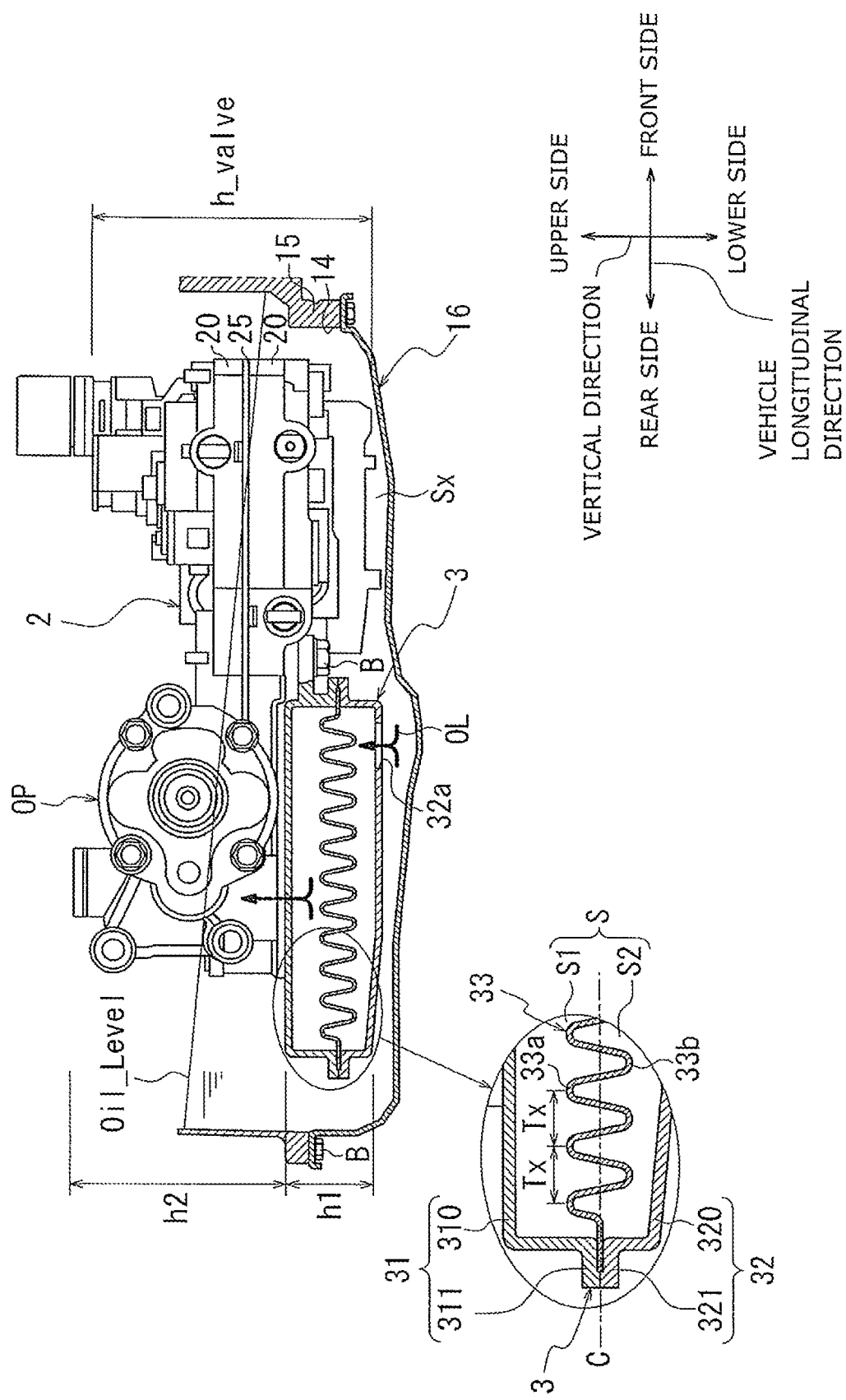
FIG. 2 is a drawing for explaining an arrangement of the oil strainer in an oil pan.

FIG. 2 is a drawing for explaining an arrangement of the oil strainer 3 in an oil pan 16. In FIG. 2, for convenience of explanation, the oil strainer 3 is illustrated by its cross section.

Figure 3:
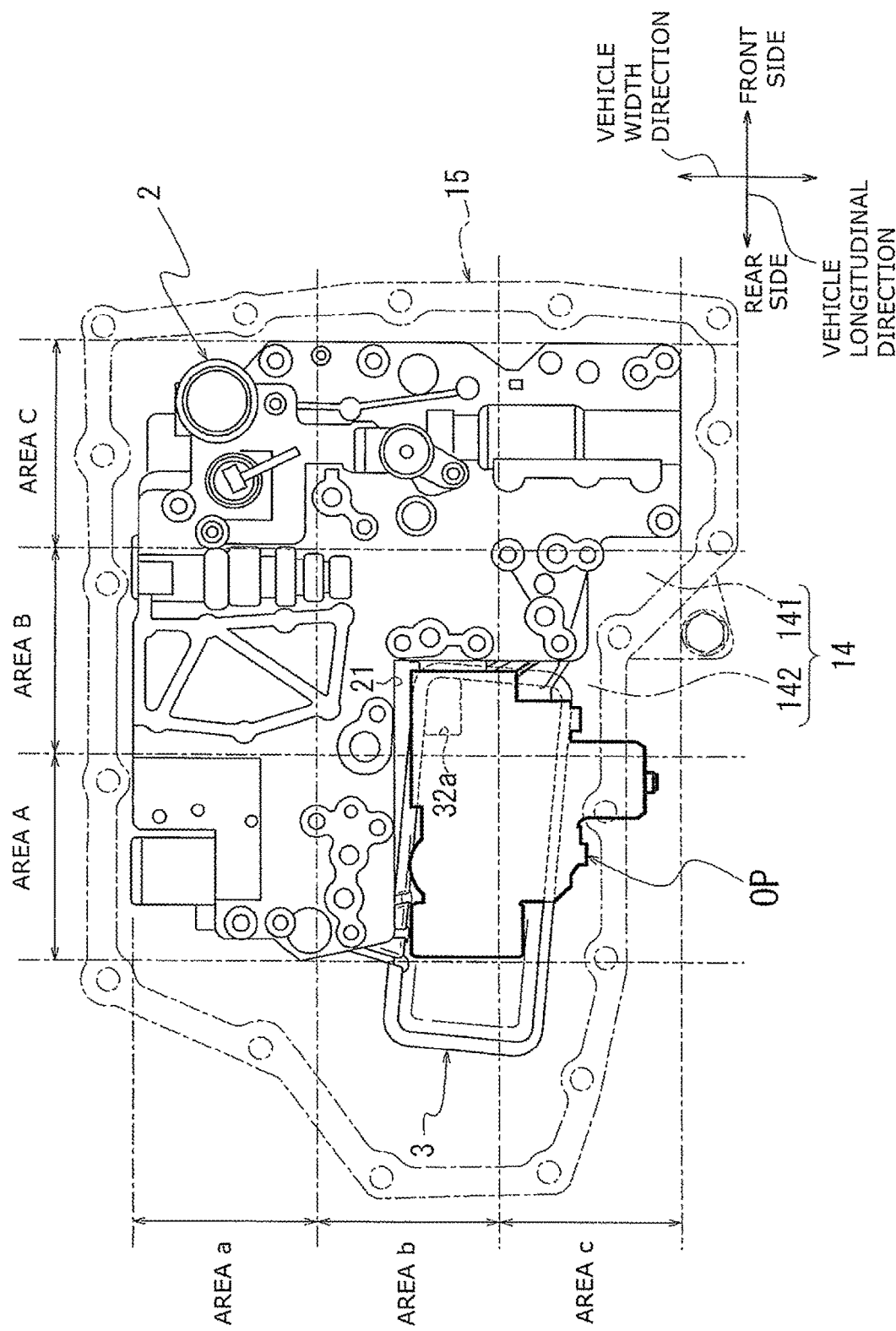
FIG. 3 is a drawing when viewing the control valve unit from above.

FIG. 3 is a drawing when viewing the control valve unit 2 from above. In FIG. 3, for convenience of explanation, a shape of an upper surface of an oil pump OP is not illustrated, but an outer peripheral edge of the oil pump OP is illustrated with a thick line. Further, a position of the circumferential wall portion 15 on a case 13 side is illustrated with a virtual line.

As shown in FIG. 1, the transmission case 10 of the belt-type continuously variable transmission 1 for the vehicle has a basic structure in which the case 13 is sandwiched between a housing 11 and a side cover 12.

When mounting the continuously variable transmission 1 in the vehicle (not shown), the housing 11, the side cover 12 and the case 13 are arranged in a vehicle width direction.

The opening 14 is provided at a lower portion of the case 13. This opening 14 is provided in order to return oil OL, used for operation of a transmission mechanism (transmission components) and lubrication of rotating elements which are accommodated in the case 13, to an oil pan 16 side (see FIG. 2).

As shown in FIG. 2, the oil pan 16 is fixed to a lower surface of the circumferential wall portion 15 surrounding the opening 14 with bolts. The opening 14 of the case 13 is closed by the oil pan 16, and a storage space Sx of the oil OL which is enclosed by the oil pan 16 is formed at the lower portion of the case 13.

As shown in FIG. 1, when viewing the opening 14 of the transmission case 10 from the oil pan 16 side, the opening 14 opens at a position on a vehicle front side with respect to an installation state of the continuously variable transmission 1 in the vehicle (not shown).

The opening 14 is formed such that an opening width, in the vehicle width direction, of the opening 14 at the vehicle front side is wider than that at a vehicle rear side.

When dividing the opening 14 in accordance with the opening width in the vehicle width direction, the opening 14 can be divided into a first opening section 141 at the vehicle front side and a second opening section 142 at the vehicle rear side.

The first opening section 141 is provided in an area from a lower side of the housing 11 located at one side of the case 13 to a lower side of the side cover 12 located at the other side of the case 13.

The second opening section 142 is provided in an area from a lower side of the case 13 to the lower side of the side cover 12.

The first opening section 141 bulges or extends from the housing 11 to the vehicle front side in a vehicle longitudinal direction (in a vehicle front-and-rear direction). An end portion 142a, located at the vehicle rear side, of the second opening section 142 reaches or extends to a position directly below a variator (the transmission component (not shown)) placed in the case 13. Then, the oil OL having lubricated the variator is returned to the oil pan 16 side through an opening (not shown) that communicates with the second opening section 142.

When viewing the continuously variable transmission 1 from the oil pan 16 side, the control valve unit 2 fixed to the case 13 and the oil strainer 3 are provided inside the circumferential wall portion 15 surrounding the opening 14 of the transmission case 10. On a depth side (or a back side) of the oil strainer 3 on a paper of FIG. 1, the oil pump OP is installed (see FIG. 2).

Here, the oil pump OP is fixed to an upper surface, in a vertical direction (in an up-and-down direction) with respect to the installation state of the continuously variable transmission 1 in the vehicle, of the oil strainer 3. When viewing the continuously variable transmission 1 from below the oil pan 16, the oil pump OP and the oil strainer 3 overlap each other in the circumferential wall portion 15. Therefore, when viewing the opening 14 of the case 13 from below the oil pan 16, almost all the area, located in the opening 14, of the oil pump OP is hidden behind the oil strainer 3.

As shown in FIG. 2, the oil pump OP sucks up the oil OL stored in the oil pan 16 through the oil strainer 3. Then, the oil pump OP pressurizes the sucked oil OL and supplies it to a hydraulic pressure control circuit (not shown) provided in the control valve unit 2.

The control valve unit 2 has a basic structure in which a separator plate 25 is sandwiched between valve bodies 20 and 20, and the hydraulic pressure control circuit (not shown) is formed in the control valve unit 2.

The hydraulic pressure control circuit is provided with a solenoid (s) driven by a command from a control device (not shown) and a control valve(s) operated by a signal pressure etc. generated by the solenoid.

The hydraulic pressure control circuit regulates (controls) an operating hydraulic pressure of the transmission component (such as the variator) from the hydraulic pressure generated by the oil pump OP. A part of the oil OL that is drained from the control valve is used for lubrication of a rotary member such as a frictional engagement element provided in the transmission case 10.

As shown in FIG. 1, when viewing the control valve unit 2 from below the oil pan 16, the control valve unit 2 is positioned in the opening 14 of the case 13. The control valve unit 2 is fixed to the lower portion of the case 13 with bolts (not shown).

When viewing the case 13, to which the control valve unit 2 is fixed, from the oil pan 16 side, almost all the area of the first opening section 141 of the opening 14 is covered by the control valve unit 2.

On the other hand, as for the second opening section 142, there are areas that are not covered by the control valve unit 2 left at the vehicle rear side (at a left side in the drawing) and at a housing 11 side (at an upper side in the drawing).

The area at the housing 11 side is a cutting portion 21 that is formed by cutting out an area of a part of the control valve unit 2.

The cutting portion 21 is provided in order for the oil strainer 3 to be able to be installed in the opening 14 by using a height h_valve of the control valve unit 2.

In the present embodiment, when viewing the control valve unit 2 from below the oil pan 16, the cutting portion 21 is formed by cutting out an area (an overlapping area) of the control valve unit 2 where the oil strainer 3 overlaps the control valve unit 2.

Therefore, the control valve unit 2 having the cutting portion 21 is shaped like a letter L when viewed from below the oil pan 16.

Thus, when dividing the control valve unit 2 into two with respect to the cutting portion 21, the control valve unit 2 can be divided into a first section 201 located at a front side of the cutting portion 21 in the vehicle longitudinal direction and a second section 202 located at one side of the cutting portion 21 in the vehicle width direction.

These first section 201 and second section 202 are formed to have a positional relationship in which the first section 201 and the second section 202 are orthogonal to each other while being in contact with the cutting portion 21.

The cutting portion 21 (a cutting-out area) of the control valve unit 2 has an opening that faces toward the vehicle rear side in the vehicle longitudinal direction and toward the housing 11 side in the vehicle width direction (the other side in the vehicle width direction) in the circumferential wall portion 15. In this state, the oil strainer 3 is placed in the cutting portion 21.

As shown in FIG. 2, the oil strainer 3 has a basic structure in which a filter 33 is sandwiched between an upper case 31 and a lower case 32.

The upper case 31 has a base portion 310 that is recessed in a direction moving away from the lower case 32 and a flange portion 311 that encloses an outer circumferential edge of the base portion 310 throughout its entire circumference.

The lower case 32 has a base portion 320 that is recessed in a direction moving away from the upper case 31 and a flange portion 321 that encloses an outer circumferential edge of the base portion 320 throughout its entire circumference.

The upper case 31 and the lower case 32 are connected to each other with their flange portions 311 and 321 overlapping each other. Further, an outer peripheral portion of the filter 33 is sandwiched between the overlapping flange portions 311 and 321.

The filter 33 divides a space S formed between the base portion 310 of the upper case 31 and the base portion 320 of the lower case 32 into two adjacent spaces S1 and S2 in the vertical direction.

In the present embodiment, the filter 33 having a bellows structure is used.

The filter 33 has the bellows structure in which a peak portion 33a and a valley portion 33b are repeated at regular intervals in an area located in the space S.

FIG. 2 shows, as an example, the bellows structure in which the peak portion 33a positioned at one side with respect to a center line C of a thickness direction of the flange portions 311 and 321 and the valley portion 33b positioned at the other side (at the oil pan 16 side) are repeated alternately in the vehicle longitudinal direction at a predetermined pitch Tx.

As shown in FIG. 1, the oil strainer 3 has a substantially rectangular shape when viewed from the oil pan 16 side. Then, the oil strainer 3 is installed with a longitudinal direction of the oil strainer 3 being set along the vehicle longitudinal direction.

The oil strainer 3 is provided with connecting pieces 313 and 314 each having a bolt hole (not shown).

The connecting piece 313 extends from a side edge at a front side (at a right side in the drawing) of the oil strainer 3 to the vehicle front side. The connecting piece 313 has a tapered shape in which a width of the connecting piece 313 is narrower as its distance from the oil strainer 3 is greater.

The connecting piece 314 extends from a side edge at a side cover 12 side (at a lower side in the drawing), in the vehicle width direction, of the oil strainer 3 to the vehicle width direction. The connecting piece 314 has a tapered shape in which a width of the connecting piece 314 is narrower as its distance from the oil strainer 3 is greater.

The oil strainer 3 is secured to the lower surface, at the oil pan 16 side, of the control valve unit 2 with bolts B and B penetrating the bolt holes (not shown) of the connecting pieces 313 and 314.

As shown in FIG. 2, the oil strainer 3 is formed such that its height is a height h1 that falls within a range of the height h_valve of the control valve unit 2.

Therefore, when securing the oil strainer 3 to the control valve unit 2, the oil strainer 3 is accommodated in the cutting portion 21 of the control valve unit 2, then the oil strainer 3 does not greatly protrude to a lower side of the oil pan 16.

As shown in FIG. 2, the lower case 32 of the oil strainer 3 is provided with an inlet 32*a* of the oil OL at a position on the front side in the vehicle longitudinal direction. The inlet 32*a* opens so as to face toward the oil pan 16 from above in the vertical direction with respect to the installation state of the continuously variable transmission 1 in the vehicle.

As shown in FIG. 1, the inlet 32*a* has a substantially rectangular shape when viewed from the oil pan 16 side. When viewing the inlet 32*a* from below the oil pan 16, the inlet 32*a* is located at a middle part, in a predetermined direction, of the control valve unit 2.

Here, the middle part, in the predetermined direction, of the control valve unit 2 when viewed from below the oil pan 16 can be defined as follows.

(a) A term "middle part" means a partition area located at the middle of partition areas that are defined by dividing the control valve unit 2 into three or more odd numbers of equal partition areas in the predetermined direction (in the vehicle longitudinal direction or in the vehicle width direction) (i.e. by dividing the control valve unit 2 such that each partition area has the same length in the predetermined direction) when viewed from below the oil pan 16.

This will be explained using FIG. 3. When dividing the control valve unit 2 into three equal areas (areas A, B and C) in the vehicle longitudinal direction, the area B located at the middle corresponds to this "middle part". When dividing the control valve unit 2 into three equal areas (areas a b and c) in the vehicle width direction, the area b located at the middle corresponds to this "middle part".

Here, a position of the inlet 32*a* can also be defined with respect to the opening 14 when viewing the transmission case 10 from below the oil pan 16 (with the opening 14 when viewing the transmission case 10 from below the oil pan 16 being a reference).

For instance, as shown in FIG. 1, the inlet 32*a* opens at a position at which a line Lm and a line Ln crosses each other. The line Lm is a line that passes through a midpoint of a width Wa, in the vehicle width direction, of the case 13. The line Ln is a line that passes through a midpoint of a width Wb, in the vehicle longitudinal direction, of the opening 14.

Therefore, the inlet 32*a* is provided at a substantially middle part of the opening 14 when viewed from below the oil pan 16. The substantially middle part of the opening 14 is also a substantially middle part of the oil pan 16 when viewing the oil pan 16 from below.

During travel of the vehicle mounting therein the continuously variable transmission 1, an oil level Oil_level (see FIG. 2) of the oil OL stored in the oil pan 16 varies under the influence of a vehicle travelling state.

For instance, when the vehicle turns, accelerates or decelerates, the oil level Oil_level of the oil OL in the oil pan 16 is inclined according to a turning radius, a turning speed, a degree of acceleration or deceleration.

An influence of the inclination of the oil level Oil_level of the oil OL is minimum at the middle part of the oil pan 16, and increases from the middle part toward an outer circumferential portion of the oil pan 16 (in the vehicle longitudinal direction, in the vehicle width direction).

As described above, when providing the inlet 32*a* at the middle part of the oil pan 16, the inlet 32*a* is located in an area where the influence of the inclination of the oil OL is minimum and the variation of a height of the oil level Oil_level is smallest.

In this case, even if the variation and the inclination of the oil level Oil_level in the oil pan 16 become large when the vehicle mounting therein the continuously variable transmission 1 turns, accelerates and decelerates, since the inlet 32*a* can be placed in the oil OL, it is possible to suitably suppress an occurrence of suction of air.

As shown in FIG. 2, the oil pump OP is installed at an upper portion, in the vertical direction, of the oil strainer 3. The oil pump OP is also provided by using the cutting portion 21 of the control valve unit 2.

The oil pump OP is formed such that its height is a height h2 that falls within the range of the height h_valve of the control valve unit 2 with the oil pump OP being installed at the upper portion of the oil strainer 3.

Therefore, when securing the oil strainer 3, on which the oil pump OP is installed, to the control valve unit 2, the oil pump OP and the oil strainer 3 can be accommodated within a range of a height of the cutting portion 21 of the control valve unit 2.

Thus, the oil pump OP does not greatly protrude upwards from the control valve unit 2.

As shown in FIG. 3, when viewing the control valve unit 2 from above, a shape (a size and an area) of the cutting portion 21 is set such that the oil pump OP does not greatly protrude from a side edge of the control valve unit 2.

As described above, by using the cutting portion 21 provided at the control valve unit 2, the oil strainer 3 and the oil pump OP do not greatly protrude to an outer side, in a height direction (see FIG. 2) and in a width direction (FIG. 3: in the vehicle longitudinal direction, in the vehicle width direction), of the control valve unit 2.

Accordingly, it is possible to ease the restriction on layout in terms of the height direction around the oil pan 16, thereby increasing degree of freedom when arranging the oil strainer 3 and the oil pump OP.

The continuously variable transmission 1 (a power transmitting device) according to the present embodiment has the following structure.

(1) A continuously variable transmission 1 comprises an oil pan 16, an oil strainer (a strainer) 3 located above the oil pan 16 and a control valve unit 2 located above the oil pan 16. The control valve unit 2 has a shape having a cutting portion 21 formed by a part of the control valve unit 2 being cut out when viewed from an oil pan 16 side. The oil strainer 3 is arranged so as to overlap the cutting portion 21.

With this structure, it is possible to ease the restriction on a height direction (a gravity direction, the vertical direction) of the oil strainer 3.

Since the height h1 of the oil strainer 3 can be increased, for instance, the filter having the bellows structure can be employed as the filter 33 set inside the oil strainer 3.

When the filter having the bellows structure is employed, a surface area of the filter can be increased. Therefore, an outside shape (an area) of the oil strainer 3 when viewed from the oil pan 16 side can be reduced, and an area in a transverse direction of the oil strainer 3 can also be reduced.

For instance, by devising or modifying a position and the shape of the cutting portion 21 provided at the control valve unit 2, the inlet 32*a* (a suction port) of the oil strainer 3 can be located at a position where the inlet 32*a* overlaps the middle part of the oil pan 16 when viewed from below the oil pan 16.

The middle part of the oil pan 16 is a place (or a position) that is affected the least by the inclination of the oil level Oil_level of the oil OL. Therefore, even if the oil level Oil_level of the oil OL in the oil pan 16 is inclined when the vehicle mounting therein the continuously variable transmission 1 turns, accelerates and decelerates, the inlet 32*a* can always be submerged in the oil OL. Thus, since the oil strainer 3 resists the inclination of the oil level Oil_level of the oil OL, suppression of the air suction can be expected.

The continuously variable transmission 1 (the power transmitting device) according to the present embodiment has the following structure.

(2) The oil strainer 3 is provided therein with a filter 33 having a bellows structure.

With this structure, an actual area of the filter 33 having the bellows structure (a zigzag structure) is larger than an area in the transverse direction of the filter 33. Therefore, in a case where a total oil passing area is made equal, mesh of the filter can be made fine, thereby improving filtering performance.

The continuously variable transmission 1 (the power transmitting device) according to the present embodiment has the following structure.

(3) An inlet (a suction port) 32*a* of the oil strainer 3 is arranged at a position where the inlet 32*a* overlaps a middle part, in a predetermined direction, of the oil pan 16 when viewed from below.

The variation of the height of the oil level Oil_level is smallest at the middle part of the oil pan 16. Therefore, even if the oil level Oil_level of the oil OL in the oil pan 16 is inclined when the vehicle mounting therein the continuously variable transmission 1 turns, accelerates and decelerates, since the oil strainer 3 has the inlet 32*a* located at the place that resists the inclination of the oil level Oil_level of the oil OL (that is affected the least by the inclination of the oil level Oil_level of the oil OL), the air suction can be suppressed.

The continuously variable transmission 1 (the power transmitting device) according to the present embodiment has the following structure.

(4) The predetermined direction is a travelling direction of the vehicle mounting therein the continuously variable transmission 1 and/or a direction (the vehicle width direction) orthogonal to the vehicle travelling direction.

For instance, when the inlet 32*a* is provided at the position where the inlet 32*a* overlaps the middle part in the vehicle travelling direction (in the vehicle longitudinal direction), the inlet 32*a* resists the variation of the oil level Oil_level of the oil OL when the vehicle mounting therein the continuously variable transmission 1 accelerates and decelerates. That is, even if the oil level Oil_level of the oil varies when the vehicle accelerates and decelerates, since the inlet 32*a* can be placed in the oil OL, it is possible to suitably suppress the air suction when the vehicle accelerates and decelerates.

For instance, when the inlet 32*a* is provided at the position where the inlet 32*a* overlaps the middle part in a direction (in the vehicle width direction) orthogonal to the vehicle travelling direction, the inlet 32*a* resists the variation of the oil level Oil_level of the oil OL when the vehicle mounting therein the continuously variable transmission 1 turns. That is, even if the oil level Oil_level of the oil varies when the vehicle turns, since the inlet 32*a* can be placed in the oil OL, it is possible to suitably suppress the air suction when the vehicle turns.

Here, the inlet 32*a* could be provided at the position where the inlet 32*a* overlaps the middle part in the vehicle travelling direction (in the vehicle longitudinal direction) and also overlaps the middle part in the direction (in the vehicle width direction) orthogonal to the vehicle travelling direction. In this case, the inlet 32*a* resists the variation of the oil level Oil_level of the oil. OL when the vehicle accelerates and decelerates and also when the vehicle turns.

That is, the inlet 32*a* could be provided in a crossing area between the middle area B when dividing (one-dimensionally dividing) the control valve unit 2 into the three equal areas A, B and C in the vehicle travelling direction and the middle area b when dividing (one-dimensionally dividing) the control valve unit into the three equal areas a, b and c in the direction (in the vehicle width direction) orthogonal to the vehicle travelling direction.

By dividing (two-dimensionally dividing) the area of the control valve unit 2 in both directions of the vehicle travelling direction and the vehicle width direction and providing the inlet 32*a* in the crossing area between the area B and the area b in this manner, it is possible to suitably suppress the air suction when the vehicle accelerates and decelerates and also when the vehicle turns.

The continuously variable transmission 1 (the power transmitting device) according to the present embodiment has the following structure.

(5) The continuously variable transmission 1 further comprises an oil pump OP directly connected to the oil strainer 3 and overlapping the cutting portion 21.

In a case where the oil pump OP cannot be installed while being adjacent to the oil strainer 3 due to a restriction on a height of an installation place of the oil pump OP in the transmission case 10, the oil pump OP has to be indirectly connected to the oil strainer 3 through an oil bypass formed at the case 13.

Therefore, as described above, the cutting portion 21 is provided at the control valve unit 2, then the oil pump OP is installed at the position where the oil pump OP overlaps the cutting portion 21 when viewed from below the oil pan 16. It is thus possible to directly connect the oil pump OP to the oil strainer 3 without through the oil bypass. With this structure, a circuit (an oil passage) that connects the oil strainer 3 and the oil pump OP can be formed at a shorter distance without having a bending part.

If the circuit (the oil passage) has the bending part, the bending part becomes a resistance to an oil flow. As a consequence, a suction resistance to the oil pump OP is great, and a load on the oil pump OP becomes heavy.

When forming the circuit (the oil passage) without having the bending part, the suction resistance to the oil pump OP can be small, and the load on the oil pump OP can be light. This therefore leads to energy saving (improvement in fuel efficiency, improvement in power efficiency).

The continuously variable transmission 1 (the power transmitting device) according to the present embodiment has the following structure.

(6) The control valve unit 2 has a port ion having an L-shaped outside shape when viewed from the oil pan 16 side, and the cutting portion (21) is adjacent to the portion having the L-shaped outside shape.

For instance, the control valve unit 2 could be shaped into a square bracket shape (or a U-shape), and the cutting portion 21 is arranged at this square bracket-shaped portion (or U-shaped portion). However, this might make a distance from one end to the other end of the control valve unit 2 longer and make a resistance of an oil passage greater. For this reason, to reduce the resistance of the oil passage to a minimum, the L-shape is preferable.

FIGS. 4A to 4F are drawings for explaining modifications to a shape of the cutting portion 21.

FIG. 4A is a drawing when viewing the control valve unit 2 from below the oil pan 16, and schematically showing a shape of the cutting portion 21 explained in the above embodiment.

FIGS. 4B to 4D are drawings for explaining shapes of cutting portions 21A, 21B and 21C of modifications when viewing control valve units 2A, 2B and 2C from below the oil pan 16.

FIG. 4E is a drawing for explaining a modification to an arrangement of an oil strainer 3D and a control valve unit 2D.

FIG. 4F is a drawing for explaining a cutting portion 21E of a modification when viewing a control valve unit 2E from a side.

In the above embodiment, the cutting portion 21 is formed into the L-shape (see FIG. 4A), and the following condition is satisfied.

(I) A shape formed by an assembly of the control valve unit 2 and the oil strainer 3 is in a substantially quadrangular shape, and the inlet 32a of the oil strainer 3 is positioned at the middle part of the assembly.

Therefore, the cutting portion 21 opens to both of a side edge 201a of the first section 201 and a side edge 202a of the second section 202 at the control valve unit 2.

For instance, as shown in FIG. 4B, a rectangular cutting portion 21A could be provided so as to open only to one side edge 202a of the control valve unit 2A, then a substantially square bracket-shaped control valve unit 2A is formed.

In this case, the second section 202 is divided into two in the vehicle width direction by the cutting portion 21A.

Also with this structure, the oil strainer 3 can be arranged by using the height of the control valve unit 2 (2A), and it is possible to ease the restriction on layout in terms of the height when arranging the oil strainer 3.

Further, as shown in FIG. 4C, a triangular cutting portion 21B could be provided by cutting the control valve unit 2B obliquely.

Moreover, as shown in FIG. 4D, an arc-shaped cutting portion 21C could be provided by cutting the side edge 202a into an arc shape.

It is noted that the present invention does not exclude a structure (see FIG. 4E) in which the L-shaped control valve unit 2D and the rectangular oil strainer 3D overlap each other when viewed from above (or from below).

Furthermore, as shown by an oil strainer 3E in FIG. 4F, the oil strainer could be formed by a shape having a section that overlaps the control valve unit 2E and a section that does not overlap the control valve unit 2E.

In this case, a height of the oil strainer 3E can be high at the section not overlapping the control valve unit 2E. Then, by setting a length of a filter 33E to be long at the section where the height of the oil strainer 3E is high, a high capturing efficiency of impurities contained in the oil OL passing through the oil strainer 3E can be expected.

Also in the cases of the shapes of the cutting portions 21A, 215, 21C, 21D and 21E as shown in FIGS. 4B to 4F, the oil strainer 3 (3, 3B to 3E) can be arranged by using the height of the control valve unit 2 (2A to 2E), and it is possible to ease the restriction on layout in terms of the height when arranging the oil strainer 3 (3, 35 to 3E).

Here, in order that the shape formed by the assembly of the control valve unit and the oil strainer is in the substantially quadrangular shape and the inlet of the oil strainer is positioned at the middle part of the assembly, the L-shaped control valve unit is preferable to the obliquely-cut control valve unit, since an layout of the L-shaped control valve unit is simpler.

The above embodiment shows an example in which the power transmitting device is the belt-type continuously variable transmission for the vehicle. However, the power transmitting device of the present invention is not limited to so-called automatic transmissions for the vehicle.

The present invention can also be applied to a device structured so that a gear train having a plurality of gears is provided and at least one gear scoops up the oil in an accommodation case of the gear train. Such a device is, e.g. a speed reducer that reduces an input rotation speed and outputs the reduced rotation speed.

Although the embodiment of the present invention has been explained above, the present invention is not limited to the structure or configuration of the embodiment. The present invention can be modified within technical ideas of the present invention as necessary.

The invention claimed is:

1. A power transmitting device comprising:
   an oil pan;
   a strainer located above the oil pan;
   a control valve unit located above the oil pan; and
   an oil pump located above the strainer,
   wherein
   the control valve unit has a recessed shape in which a part of one side edge of the control valve unit is recessed toward an opposite other side edge of the control valve unit when viewed from below the oil pan, the recessed shape being shaped by a cut-out portion so that at least a part of the strainer is accommodated in the recessed shape when viewed from below the oil pan, and so that the strainer and the control valve unit do not overlap each other in a vertical direction, and
   the strainer and the oil pump are arranged at a position in the cut-out portion.

2. The power transmitting device as claimed in claim 1, wherein
   the cut-out portion is formed by an area, which overlaps the strainer, of the control valve unit being cut out when viewed from below the oil pan.

3. The power transmitting device as claimed in claim 1, wherein
   a suction port of the strainer overlaps the cut-out portion when viewed from below the oil pan.

4. The power transmitting device as claimed in claim 1, wherein
   the strainer is provided therein with a filter having a bellows structure.

5. The power transmitting device as claimed in claim 1, wherein
   a suction port of the strainer is arranged at a position where the suction port overlaps the cut-out portion located at a middle part, in a predetermined direction, of the oil pan.

6. The power transmitting device as claimed in claim 5, wherein
   the predetermined direction is a vehicle travelling direction and/or a direction orthogonal to the vehicle travelling direction.

7. The power transmitting device as claimed in claim 1, wherein:
   the oil pump is directly connected to the strainer and overlapping overlaps the cut-out portion.

8. The power transmitting device as claimed in claim 1, wherein
   the control valve unit has a portion having an L-shaped outside shape when viewed from below the oil pan side, and the cut-out portion is adjacent to the portion having the L-shaped outside shape.

\* \* \* \* \*